United States Patent [19]

Wasserman

[11] 4,067,319
[45] Jan. 10, 1978

[54] SOLAR ENERGY CONVERTING APPARATUS

[76] Inventor: Kurt J. Wasserman, Schefflers Road, Westtown, N.Y. 10998

[21] Appl. No.: 708,746

[22] Filed: July 26, 1976

Related U.S. Application Data

[62] Division of Ser. No. 605,872, Aug. 19, 1975, abandoned.

[51] Int. Cl.² .............................................. F24J 3/02
[52] U.S. Cl. ................................. 126/271; 237/1 A
[58] Field of Search .............. 126/270, 271; 237/1 A; 264/41; 47/56

[56] References Cited

U.S. PATENT DOCUMENTS

| | | | |
|---|---|---|---|
| 2,929,122 | 12/1975 | Alkasab | 126/271 |
| 2,969,788 | 1/1961 | Newton | 126/271 |
| 3,254,703 | 6/1966 | Thomason | 126/271 |
| 3,813,461 | 5/1974 | Murayama et al. | 264/41 |
| 3,915,147 | 10/1975 | Rineer | 126/271 |
| 3,923,381 | 12/1975 | Winston | 126/271 |

*Primary Examiner*—Kenneth W. Sprague
*Attorney, Agent, or Firm*—Lewis H. Eslinger

[57] ABSTRACT

Solar energy converting apparatus having a plurality of parallel troughs each of which includes a receiving portion for receiving solar radiation and an exit portion. The troughs are parabolic in shape and the side walls thereof are pivotable about an axis which is substantially parallel to the longitudinal axis of a trough. Heat transfer apparatus is disposed adjacent the exit portions of the troughs, the heat transfer apparatus defining a conduit for heat transfer fluid whereby heat derived from received solar radiation is transferred to the fluid. The fluid may be either in liquid or gaseous form.

8 Claims, 8 Drawing Figures

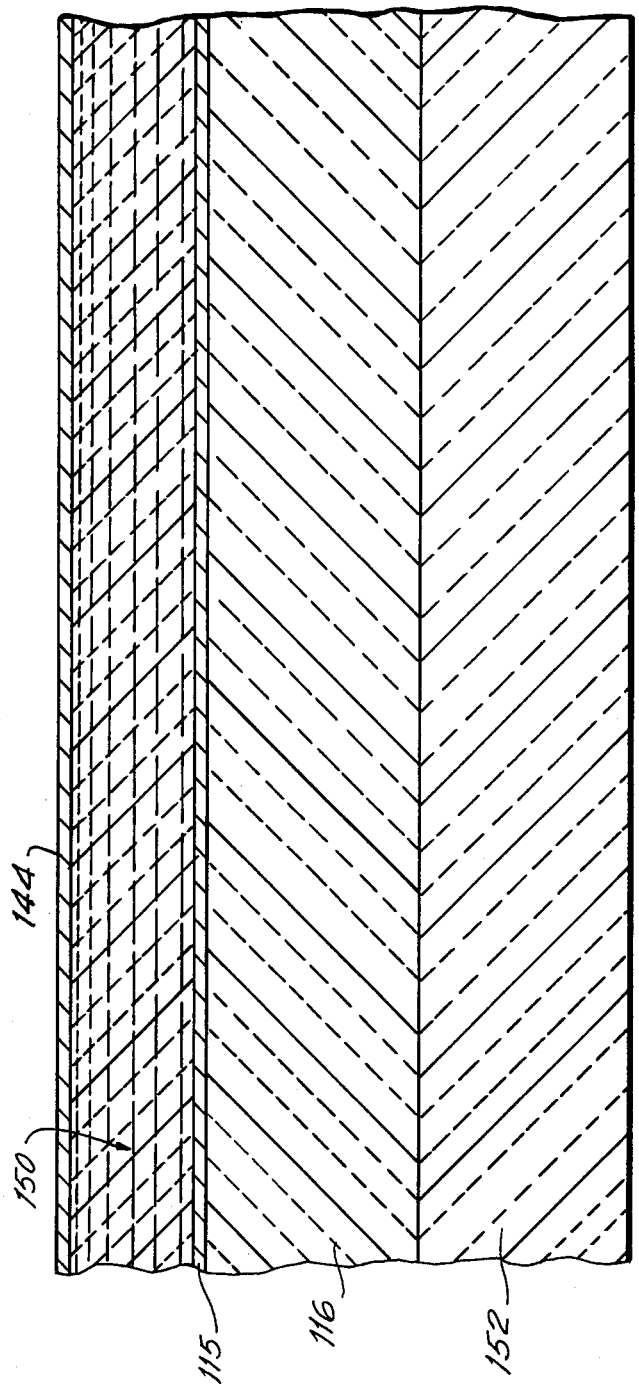

SOLAR ENERGY CONVERTING APPARATUS

This is a division of application Ser. No. 605,872, filed Aug. 19, 1975, now abandoned.

BACKGROUND OF THE INVENTION

This invention relates to solar energy converting apparatus and, more particularly, to an improvement in such apparatus wherein a solar radiation collector is formed of a plurality of parabolic-shaped parallel troughs which are pivotable about longitudinal axes.

The energy contained in solar radiation provides a useful source which can be exploited so satisfy much of the requirements which now are satisfied by other energy sources, such as fossil fuels, nuclear energy, hydroelectric power sources, and the like. Ideally, received solar radiation can be converted into thermal energy and then used for numerous other purposes. For example, the heat derived from solar radiation can be used, theoretically, to produce steam which, in turn, can serve as a source of motive power. As another example, such generated steam can be used to drive conventional electrical generating equipment. As a still further example, the heat derived from solar radiation can be suitably stored and used to heat dwellings and other edifices, as well as a source of hot water.

Many prior art solar energy converting devices are known to derive heat from solar radiation. Typically, such apparatus includes a heat collecting plate which is darkened, or otherwise suitably treated, and which receives impinging solar radiation. As is recognized, the collecting plate is heated by the received radiation, and the heat produced thereby is transferred to suitable heat transfer fluid. Generally, the heat transfer fluid, which may be a liquid, is adapted to flow in suitable conduits, or channels, disposed beneath the heat collecting plate. Typically, such fluid conduits are formed of conventional pipes adjacent the collecting plate to thereby permit heat to be transferred directly from the plate to the fluid. The heated fluid then is permitted to flow to a suitable storage vessel, or the like, or to other devices wherein the heat is utilized. In many applications, the heat transfer fluid flows through a closed loop so as to receive heat from the collector plate and to subsequently discharge the heat to achieve the particular purpose for which the system is designed. In other systems, the heat transfer fluid is gaseous but, nevertheless, is provided for the same purpose as the aforedescribed heat transfer liquid. Thus, the heated gas may be used in, for example, a hot air heating system, or may be used to drive turbine or other devices.

Most prior art systems which use a flat or substantially flat collecting plate must position that plate with respect to the sun so as to receive optimum radiation. Of course, maximum solar radiation is received if the collecting plate is caused to track the trajectory of the sun, thus requiring diurnal tracking. Such tracking requires complex and costly machinery and significantly adds to the expense of solar energy conversion. Moreover, such prior art systems have not been capable of generating a significant amount of heat to thus justify the use of such complex and costly apparatus. Indeed, in those geographic areas wherein less than a maximum amount of sunshine is available on a daily basis, prior art solar energy converting apparatus has not found favorable application.

A marked improvement over conventional solar energy converters has been proposed by Roland Winston. Winston's proposal is to add a solar energy concentrator over the heat collecting plate so as to maximize the concentration obtainable by a solar energy converter. In particular, the radiation concentrator consists of a parabolic-shaped light-collecting trough. The axis of the parabola which forms the trough is inclined at an angle $\theta_{max}$ to the optic axis thereof. The angle $\theta_{max}$ is known as the half angle of maximum beam divergence. It has been found that, with a parabolic-shaped collecting trough, if the entrance aperture to the trough has a diameter $d_1$ and the exit aperture from the trough has a diameter $d_2$, then the maximum permissible concentration factor is equal to $d_1/d_2 + (n_2/n_1)(1/\sin\theta_{max})$, where $n_1$ and $n_2$ are the indices of refraction at the entrance and exit, respectively. If such indices of refraction are equal, then the height L of the trough is defined as $L = (\frac{1}{2})(d_1 + d_2)\cot\theta_{max}$. A complete mathematical discussion of this parabolic-shaped light collecting trough is set forth in "Principles of Solar Concentrators of a Novel Design" by Roland Winston, 16 Solar Energy 89–95 (Pergamon Press 1974).

In a radiation concentrator of the type proposed by Winston, solar radiation can be concentrated by a factor of 10, without diurnal tracking. That is, a sufficient amount of heat can be produced by a stationary solar energy converter. If such an energy converter is provided with plural parallel troughs, the positioning thereof with respect to the sun need be modified only to account for seasonal changes. However, even with this improved radiation concentrator, it is necessary to mount the concentrator on a suitable support whereby the optic axis of each trough exhibits a suitable angle with respect to the vertical. This angle generally is equal to 45°, but may encompass a range of from 30° to 60°. Such angulation requirements of the improved solar concentrator thus limits its ready incorporation into existing structures or into planned edifices. Consequently, the concentrator generally cannot be incorporated into, for example, a building. Rather, it must be annexed to a structure with the attending increase in cost and non-integral design. That is, the materials which are used in such a solar energy converter cannot be used as part of the building structure, such as the roof, and thus increase the total cost of the building.

As another disadvantage of this type of improved solar energy converter, a substantial amount of heat loss will occur during those hours when no solar radiation is received, e.g., during the night. To minimize such heat loss, additional thermal insulating devices must be used to cover, or shield, the radiation concentrator. Also, even though only minimal angular adjustment need be effected, as during seasonal changes, nevertheless, it is necessary to provide the requisite adjusting machinery. This has the same disadvantages as found in the conventional solar energy converters of the type described hereinabove.

OBJECTS OF THE INVENTION

Therefore, it is an object of the present invention to provide an improved solar energy converting apparatus.

Another object of this invention is to provide solar energy converting apparatus including a plurality of parabolic-shaped radiation collecting troughs wherein the side walls forming such troughs are pivotable. A still further object of this invention is to provide an improved solar energy converting apparatus wherein heat losses are minimized, even during those periods wherein solar radiation is not received.

Yet a further object of this invention is to provide improved solar energy converting apparatus wherein the support housing of the solar energy converter serves the additional function of thermal insulation.

Another object of this invention is to provide improved solar energy converting apparatus which can be positioned in any arbitrary angle with respect to the sun, and need not be fixedly disposed in a given angular relation.

An additional object of the present invention is to provide improved solar energy converting apparatus which can be integrally and aesthetically formed as a part of an edifice, such as the roof or wall of a building.

A still further object of this invention is to provide solar energy converting apparatus having improved fluid flow channels therein to optimize the transfer of heat to a heat transfer fluid.

Various other objects and advantages of the present invention will become apparent from the ensuing detailed description, and the novel features will be particularly pointed out in the appended claims.

SUMMARY OF THE INVENTION

In accordance with the present invention, solar energy converting apparatus is comprised of a plurality of parallel troughs, each trough being formed of parabolic-shaped side walls having a solar radiation receiving portion and a solar radiation exit portion; the side walls being pivotable about respective axes which are substantially parallel to the longitudinal axis of a trough; and heat transfer apparatus is disposed adjacent the exit portions of the troughs, the heat transfer apparatus providing a conduit for heat transfer fluid.

BRIEF DESCRIPTION OF THE DRAWINGS

The following detailed description will best be understood in conjunction with the accompanying drawings wherein:

FIG. 7 is a sectional view of still another embodiment of heat transfer apparatus which can be used with this invention.

DETAILED DESCRIPTION OF THE DRAWINGS

Figure 1A:
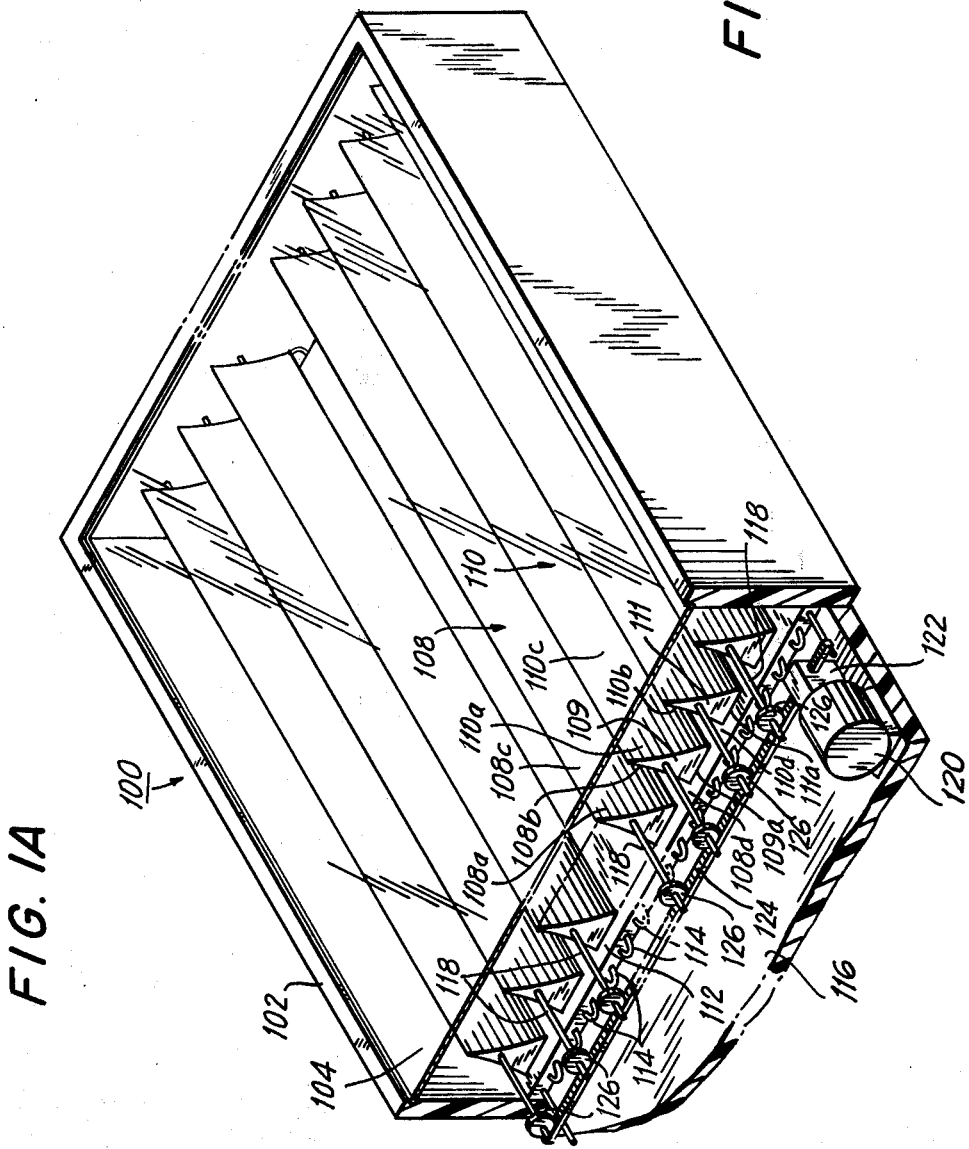
FIG. 1A is a schematic view of one embodiment of solar energy converting apparatus in accordance with the present apparatus.

Referring now to the drawings wherein like reference numerals are used throughout and, in particular, to FIG. 1A, there is illustrated a schematic diagram of one embodiment of solar energy converting apparatus 100 in accordance with the teachings of this invention. For convenience, and to facilitate a ready understanding of this invention, the solar energy coverting apparatus of FIG. 1A is shown as an integral unit which is substantially self-contained and which can be positioned in any convenient location, soon to be described, to receive solar radiation and to convert same to another form of energy. Accordingly, the illustrated embodiment of the solar energy converting apparatus 100 is comprised of a housing formed of, for example, an upstanding perimeter wall 102 having a base 116 upon which the illustrated members are supported, the housing serving to form the self-contained structure of this embodiment. The upper portion of the housing, as viewed in FIG. 1A, is provided with a transparent plate member 104 which, preferably, forms an air-tight sealed, transparent upper wall for the housing. The transparent plate member 104 may be comprised of glass, plastic or the like. Preferably, this member is a relatively poor heat conductor. As shown, the transparent plate member 104 forms a thermal barrier between the solar collector therebeneath and the ambient, as will soon be described, and provides the so-called greenhouse effect which is well known to those of ordinary skill in the solar radiation arts.

Disposed beneath the transparent plate member 104 and contained within the perimeter walls 102 is the solar radiation collector mechanism. The collector is formed of a plurality of parallel troughs, such as troughs 108, 110, ..., each of which, when viewed in cross-section, exhibits a parabolic shape. For example, the parabolic-shaped trough 108 is formed of opposite side walls 108a, 108b, these side walls defining a parabola such that the trough 108 has a solar radiation receiving portion, or aperture 108c and a solar radiation exit portion, or aperture, 108d. As is appreciated, solar radiation is transmitted through the transparent plate member 104 and thence through each receiving aperture of the parallel troughs, and then is directed to each exit aperture thereof. The radiation concentrating capabilities of a collector formed of plural parallel troughs is described in detail in the aforementioned Winston article and, moreover, is disclosed in detail in U.S. Pat. application Ser. No. 429,161, filed on Dec. 28, 1973 by Roland Winston, and entitled "Radiant Energy Collection", the disclosures of this application being incorporated herein by reference. Accordingly, in the interest of brevity, further description of the concentrating capabilities of the parabolic-shaped collector need not be described.

The side walls of the parallel troughs present reflective surfaces to the received solar radiation. That is, the surface of the side walls 108a, 108b of the trough 108, for example, are formed of reflective material, such as a reflective metal, for example, aluminum, or are provided with a reflective coating or surface layer. As one example of manufacturing the parabolic-shaped troughs, the side walls may be made by rolling or extruding aluminum into the desired, parabolic shape. As shown, adjacent troughs 108, 110 have their respective side walls 108b and 110a mechanically interconnected to each other in back-to-back relation. Similarly, the side wall 108a is interconnected in back-to-back relation with the side wall of the other adjacent parabolic-shaped trough, not shown. Consequently, a triangular-shaped space is defined by the interconnected back-to-back side walls. This defined space may remain hollow or, as is preferred, may be filled with a thermal insulating material. That is, it is expected that the air in this space will be heated when the solar energy converting apparatus is exposed to solar radiation. Hence, to minimize expected heat losses therein, this space preferably is filled with a thermal insulating material, such as an insulating foam which may be polyurethane, or the foamable composition disclosed in U.S. Pat. No. 3,481,887, the disclosure of which is incorporated herein by reference, or the insulating material known as "Xentex" manufactured by Exxon Corporation, for example. When a foamed thermal insulating material is used between the interconnected back-to-back side walls, it is appreciated that the parabolic-shaped troughs can be formed by rolling or extruding suitable materials into the desired parabolic shape and then injecting the foaming material into the shape defined by the back-to-back side walls. The insulating foam may, if desired, serve as a structural support for the side walls of the troughs.

As will soon be described, the parabolic-shaped troughs are pivotably supported within the housing such that the exit portions thereof, such as the exit apertures 108d, 110d, . . . , are spaced from the heat transfer apparatus. Such heat transfer apparatus is adapted to receive the concentrated solar radiation from the parabolic-shaped collecting troughs and to convert same into thermal energy. Such heat transfer apparatus is well known, and one illustrated example thereof may be comprised of a plurality of fluid conduits 114 which extend, in serpentine fashion, beneath the collecting troughs. The fluid contained in such conduits 114 may comprise a suitable heat transfer liquid capable of withstanding high temperatures or, alternatively, may comprise a gas. The specific fluid which is used with the illustrated solar energy converting apparatus forms no part per se of the present invention. Hence, any suitable liquid or gas may be used. The conduits 114, therefore, may comprise suitable liquid conducting channels, such as pipes or tubes, or registers for directing the passage of gas therein. If desired, the fluid may be pumped through the conduits by conventional liquid- or gas-pumping mechanisms, not shown. As an alternative, and depending upon the particular installation of the illustrated solar energy converting apparatus, liquid may flow through the conduits under the influence of gravity and gas may be transmitted through the conduits in accordance with well-known convection principles.

The conduits 114 are provided in a heat insulating support medium 112 which may be formed of any of the aforenoted materials which can be used to fill the spaces defined by the back-to-back parabolic-shaped side walls, described hereinabove. Although the thermal insulating medium 112 may comprise the base of the illustrated housing, it is preferred to support this medium 112 on a separate base 116 which also is formed of heat insulating material. As is appreciated, the base 116 and peripheral walls 102 of the housing all may be formed of the same material which, therefore, is adapted to provide rigid support characteristics as well as heat insulating characteristics for the illustrated apparatus. Any suitable material can be used therefor, and one such material is "Xentex".

In accordance with a principle feature of the present invention, the parallel troughs 108, 110, . . . , all are adapted to be pivoted about respective axes, each pivot axis being substantially parallel to the longitudinal axis of the trough. In the embodiment depicted in FIG. 1A, this pivot capability is achieved by providing a plurality of pivot shafts 118 which are mechanically connected to the back-to-back side walls of the parabolic-shaped troughs. That is, a pivot shaft 118 may be fixed to, for example, a triangular-shaped end plate which is secured to the end portions of, for example, the side walls 108b and 110b of the adjacent troughs 108 and 110, respectively, and extends therebetween, as shown. Alternatively, if the space between these adjacent side walls is filled with insulating foaming material, the shaft 118 may be fixed to that insulating material. It is preferable to provide shafts 118 extending from all of the end faces of the interconnected side walls, as viewed in FIG. 1A.

The shafts 118 are journalled for rotation in at least one of the peripheral walls 102. Preferably, the opposite peripheral walls, that is, the peripheral walls at opposite ends of the longitudinal axes of the troughs serve to support the shafts 118 so as to effectively suspend the collecting troughs between the transparent plate 104 and the heat transfer apparatus comprised of the insulating medium 112, the conduits 114 and the base 116 of the housing. Accordingly, the shafts 118 may extend between such opposite peripheral walls or, alternatively, separate shafts may be associated with the respective walls.

The shafts 118 are adapted to be pivotably driven to correspondingly pivot the side walls, and thus the troughs, in response to a manual or mechanical operation. Hence, in one embodiment, a motor 120 is mechanically coupled through suitable gearing and transmission devices 122 to a rack 124. Each of the shafts 118 is provided with a pinion 126 which engages the rack. Hence, as is appreciated, the motive power imparted to move the rack 124 by the motor 120 serves to rotate the pinions 126 which, in turn, rotate the shafts 118 so as to pivotally drive the troughs 108, 110, . . . , about their respective pivot axes. It is preferred that all of the troughs are simultaneously pivotally driven. As an alternative, the motive driving force may be imparted by manually driven members, such as a hand crank, a pulley system, or the like.

Although not shown herein, it is contemplated that various other drive transmission mechanisms can be used to transmit motive power from, for example, the motor 120 to the shafts 118. Thus, in an alternative embodiment, the rack 124 may be replaced by a drive cable which is deployed about respective pulleys, the pulleys being fixed to the shafts 118, and the drive cable being entrained about a motor drive pulley. Of course, various other devices, such as chains, drive belts, and the like, may be used.

It is recognized that, when used to convert solar energy, the illustrated apparatus 100 functions such that the parallel troughs receive solar radiation and direct same to the heat transfer apparatus with optimum concentration. Consequently, the heat transfer fluid within the conduits 114 receives the heat absorbed by a selectively absorbing collecting plate which may comprise the surface of the medium 112, and the fluid then serves to discharge this heat into suitable further apparatus. For example, a heat store may be provided to store the converted heat for subsequent use. Alternatively, the heat may be used to drive additional apparatus, such as steam-driven devices, to convert the thermal energy into an additional form of energy, such as mechanical, electrical or the like.

Since the parabolic-shaped troughs, if positioned to be disposed to extend longitudinally in an east-west direction, for example, need not be driven for diurnal tracking, the seasonal tracking of solar movement may be effected merely by operating the drive mechanism so as to pivot the troughs about the respective shafts 118. In this manner, the entire housing need not be shifted or otherwise adjusted to effect such seasonal tracking. Consequently, the use of pivoted troughs significantly reduces the complexity and cost of adjustment mechanisms which would otherwise be required. Other advantages derived from using pivotable troughs will be described hereinbelow.

Figure 1B:
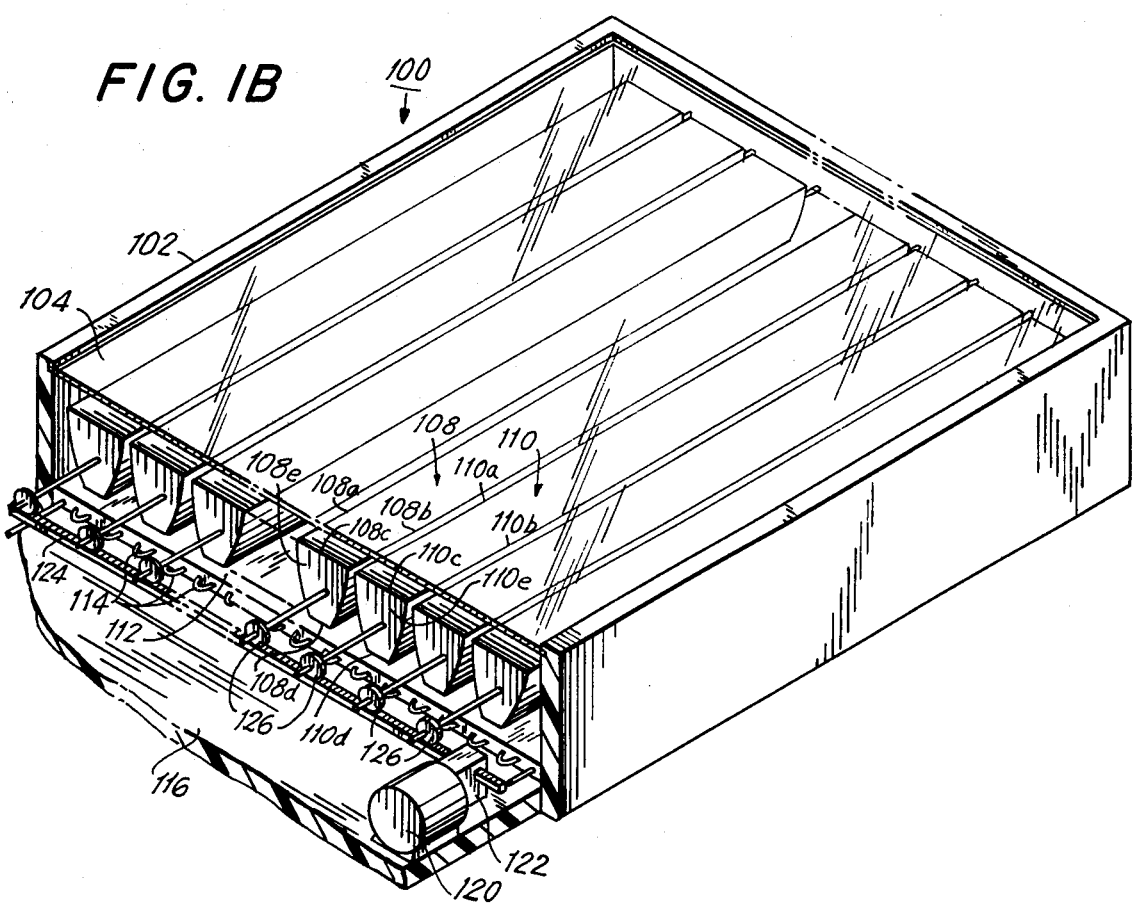
FIG. 1B is a schematic view of another embodiment of solar energy converting apparatus.

Referring now to an alternative embodiment shown in FIG. 1B, the solar energy converting apparatus 100 is substantially similar to the apparatus just described with respect to FIG. 1A except that an alternative arrangement is used to pivot the troughs. More particularly, whereas the shafts 118 in FIG. 1A are fixed to the triangular-shaped end plates 109 or to the insulating material provided in the space defined by the back-to-back side walls, the shafts 118 in FIG. 1B are fixed to end plates 108e, 110e, . . . , which are disposed at opposite ends of the respective troughs. Hence, in FIG. 1B, the side walls of adjacent troughs are not interconnected. Nevertheless, suitable heat insulating material can be provided therebetween. Of course, to facilitate the pivoting of the troughs, such heat insulating material preferably should not be rigid, rather, it should be compressible or deformable.

Figure 2:
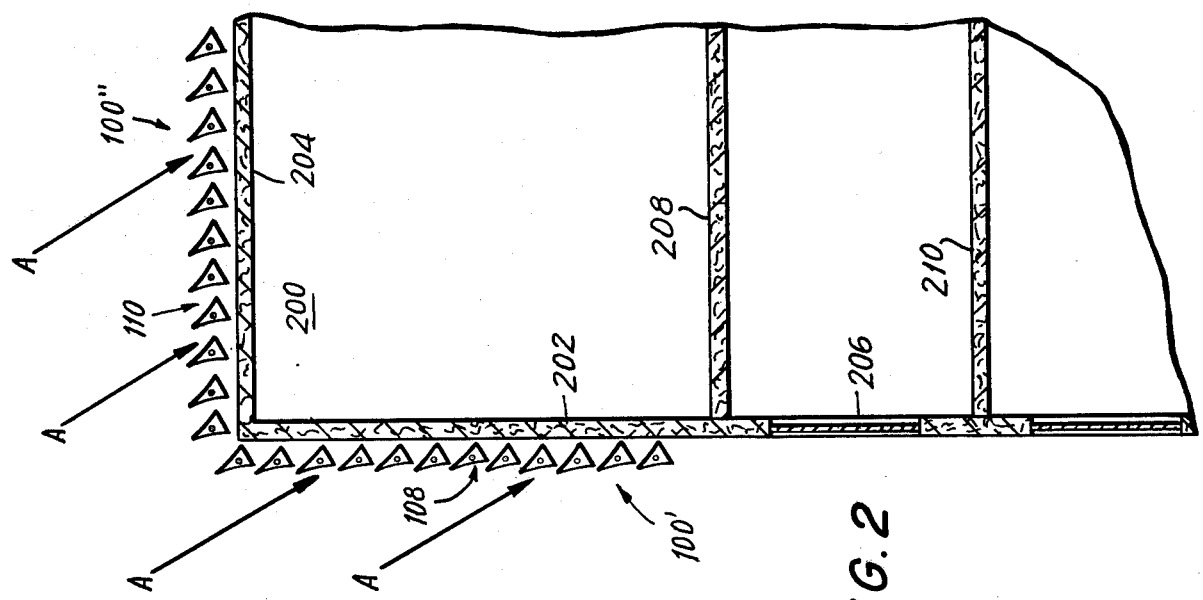
FIG. 2 is a schematic representation of one application wherein the present invention can be employed.

Referring now to FIG. 2, a contemplated application of the solar energy converting apparatus 100 is schematically depicted. Since the housing, and in particular, the peripheral walls 102 and base 116, can be formed of suitably rigid, insulating materials, the housing, and thus the apparatus 100, can be readily integrated into the structure and construction of an edifice, such as a building. Moreover, since the parabolic-shaped troughs 108, 110, . . . , can be pivoted so as to assume any convenient angular position within the housing, there is no limitation as to the particular configuration in which the apparatus 100 must be positioned. Thus, whereas prior art solar energy converting apparatus required that the collector assume a particular angle with respect to the solar trajectory, the present invention permits the apparatus 100 to be fixedly positioned in any desired angular configuration because the troughs merely may be pivoted to the preferred angle. Thus, in the FIG. 2 application, one embodiment of the solar energy converting apparatus 100' may be positioned or integrally constructed with a side wall 202 of an edifice, such as a building 200. Of course, the apparatus 100' should be located at the uppermost portion of the edifice so as to assure maximum reception of solar radiation. As shown, if solar radiation impinges with the direction indicated by the arrows A, the troughs 108 of the solar energy converting apparatus 100' may be pivoted to assume an angle such as depicted. The pivoting of the troughs, although distorting the parabolic shape thereof, does not significantly attenuate the concentration factor achieved by the apparatus.

As an alternative positioning thereof, the solar energy converting apparatus 100" of the type previously described with respect to the embodiments of FIGS. 1A and 1B can be positioned on the roof 204 of the edifice 200. In this location, it is appreciated that the troughs 110 are pivoted to assume the illustrated angular arrangement so as to receive the solar radiation A.

Of course, any desired positioning of the apparatus 100 can be employed. Thus, depending upon the location of the apparatus and the edifice with which it is to be used, the solar energy converter 100 may be positioned in a flat horizontal configuration, a flat vertical configuration or any other angled configuration therebetween. By reason of the pivoting capabilities of the parallel troughs, the particular positioning of the housing is not of paramount importance. It should therefore be fully appreciated that this feature of the present invention enhances the portability of the solar energy converting apparatus 100. Accordingly, the apparatus can be used to provide the necessary energy to drive a vehicle, portable work equipment, or the like. Also, since the particular angulation and location of the solar energy converting apparatus 100 no longer is critical, such apparatus can be incorporated into other structures without diminishing the aesthetic qualities thereof.

Figure 3:
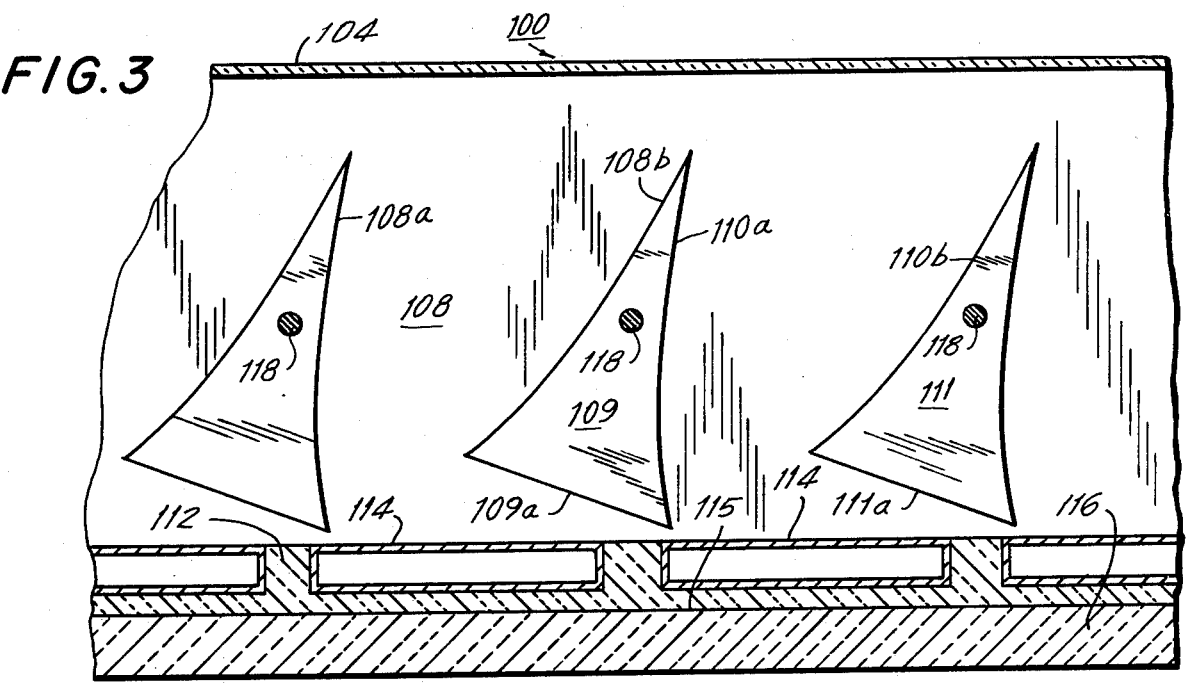
FIG. 3 is a sectional view of the solar energy converting apparatus in accordance with another embodiment of this invention.

Further modifications and embodiments of the present invention now will be described with respect to FIGS. 3 and 4. In FIG. 3, the troughs 108, 110, . . . , are shown as having been pivoted about the shafts 118 so as to receive solar radiation regardless of the angular configuration of the housing. As is also shown, the conduits 114 are of rectangular cross-section and are disposed opposite respective exit apertures of the parabolic-shaped troughs. Thus, solar radiation is directed onto the conduits 114, which preferably have a darkened selectivity absorbing surface so as to maximize the absorption of heat. Heat losses are reduced by providing the heat insulating medium 112 about the conduit. As is apparent, each conduit 114 should have a width that is sufficient to receive solar radiation regardless of the angle through which the troughs are pivoted. If desired, the conduits 114 may be of any other geometric shape, and need not be limited solely to the illustrated rectangular configuration.

Figure 4:
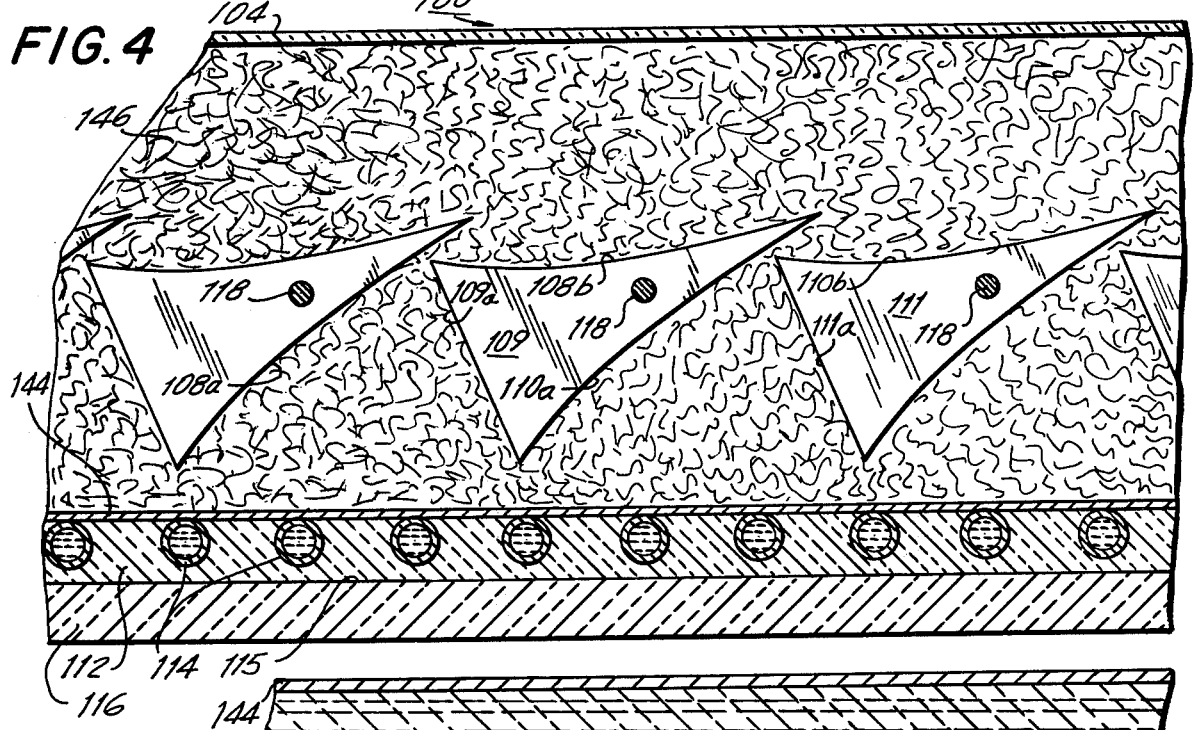
FIG. 4 is a section view of a still further embodiment of solar energy converting apparatus in accordance with this invention.

In FIG. 4, the collecting troughs are shown in a substantially closed condition. This condition is preferred during periods when solar radiation is not received, such as during inclement weather, at night, and the like. It is appreciated that, during these periods, heat is not transferred to the fluid in the conduits 114. Nevertheless, such fluid may discharge heat which previously had been transferred thereto when solar radiation had been received. Accordingly, to further minimize heat losses of this invention, the pivot capabilities of the troughs are such that only minimal heat loss from the fluid within the conduits 114 obtains. Accordingly, if the space defined by the back-to-back side walls, such as side walls 108b and 109a, is filled with heat insulating material, it is recognized that an insulating barrier is formed above the conduits 114 when the troughs are closed.

As a further precaution against heat losses, suitable insulating material 146 may be provided in the troughs themselves. That is, as shown, such insulating material 146 may be disposed between the transparent plate member 104 and the conduits 114. Such insulating material should, of course, exhibit favorable light transmissive characteristics so as to avoid significant attenuation of the solar radiation which is transmitted to and through the collecting troughs. As typical examples, this insulating material may be an insulating gel, resilient fiber, or the like.

In the embodiment of FIG. 4, a heat collecting plate 144 is provided beneath the pivotable troughs and the conduits 114 are in good thermal contact with the collecting plate. Accordingly, the conduits may be mounted to the heat collecting plate as by a thermally conductive adhesive, silver solder, or the like. Alternatively, the collecting plate and conduits may be of unitary construction. Furthermore, all the conduits 114 are depicted as lying beneath the plate 144; it should be apparent that they may be disposed above the plate, closer to the exit apertures of the troughs. Also, although the conduits may be of circular cross-section, thermal contact with the heat collecting plate is improved if th contact with the heat collecting plate is improved if the contact area is increased, for example, by using rectangular conduits 114. The collecting plate 114 may be a separate plate which is supported by the medium 112 or, alternatively, may be formed as a coating or top layer on the insulating medium. As is conventional, the plate 144 has a darkened selectively absorbing surface which, as one example, may be formed of aluminum foil having a black metallic oxide or metallic sulfide surface facing the exit apertures of the troughs.

In addition, the plane defined by the insulating medium 112 and the base 116 may be provided with a layer or coating of reflective material. Such reflective surface should face the collecting plate 144. In this fashion, heat which might be discharged from the fluid within the conduits 114 would be reflected back thereto. Although this technique does not completely avoid heat losses, nevertheless, the use of a heat reflector 115 significantly reduces the amount of such heat losses.

Figure 5:
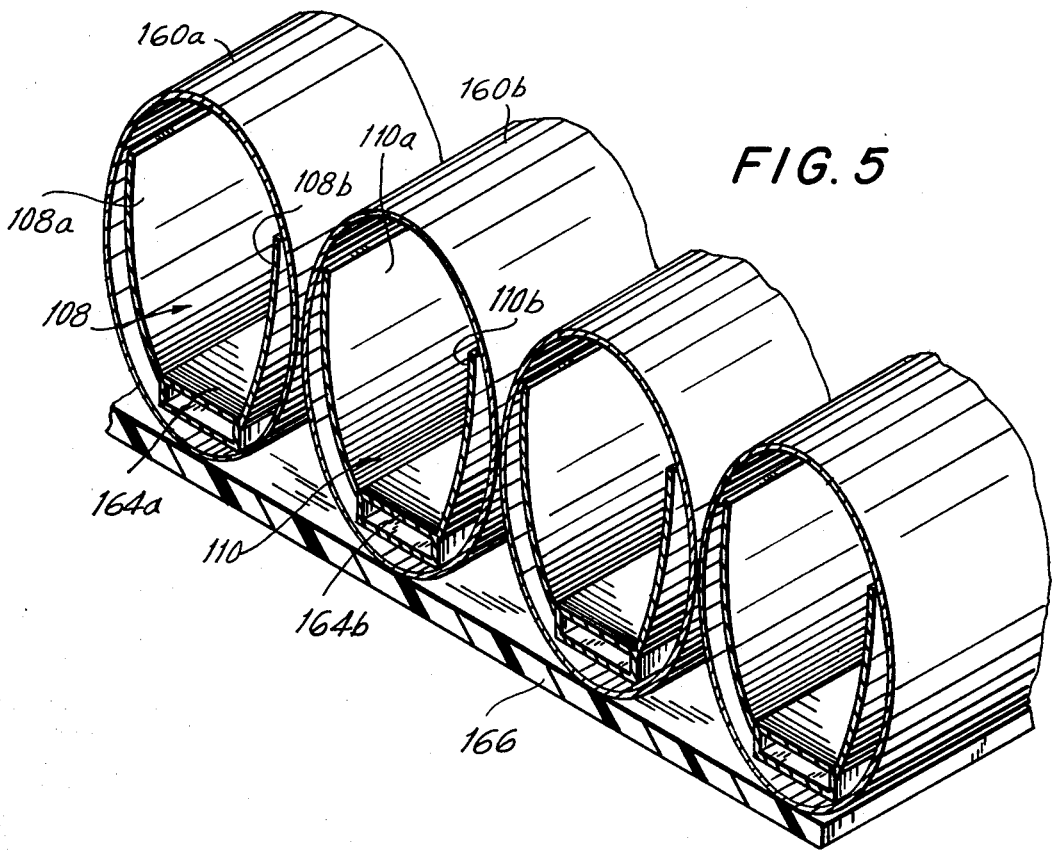
FIG. 5 is a schematic view of yet another embodiment of solar energy apparatus which can be used with the present invention.

A still further embodiment of solar energy converting apparatus utilizing the principles of this invention is shown in FIG. 5. As illustrated therein, each of the parallel parabolic-shaped troughs 108, 110, ..., is individually housed within a transparent enclosure 160a, 160b, ..., respectively. The enclosure may be glass, plastic, or the like and is evacuated such that each trough is housed within a substantially vacuum environment. In addition, individual conduits 164a, 164b, ..., are disposed at the exit apertures of the troughs 108, 110, ..., respectively, so that received solar radiation is directed to impinge thereon in the manner previously described in respect to FIG. 3.

Although not shown, end plates of the type described with reference to FIG. 1B are displaced at opposite ends of the respective troughs to which are fixed shafts suitable for pivoting the troughs. These shafts emerge from the end walls of the enclosures 160a, 160b, ..., as through suitable sealing elements, so as to be driven in the aforenoted manner, thereby to pivot the troughs. Also, the individual conduits 164a, 164b, ..., pass through the end walls of the enclosures to transmit the heat transfer fluid to further apparatus. This permits a suitable closed loop system of the aforementioned type to be used.

It should be recognized that if air is removed from the enclosures 160a, 160b, ..., convection current cannot occur, and thus the major source of heat losses is avoided. Consequently, the use of insulation, such as the previously described medium 112, the base 116 and the insulation 146, is not necessary. Furthermore, since the enclosures are transparent they serve the same purpose as the transparent plate member 104.

Any suitable support structure 166 can be used to support the parabolic-shaped troughs in their enclosures so as to form an integral solar energy converting circuit. The support structure 166 need not be of heat insulating material because a substantial vacuum surrounds each trough and associated conduit — the vacuum offering good heat insulation characteristics.

Suitable supporting elements can be used to effectively suspend each trough within its enclosure. Such supporting elements, which may be struts for example, can be constructed of insulating material to avoid heat losses therethrough. Also, it is apparent that the entire enclosure need not be transparent, since it is necessary only to permit solar radiation to pass therethrough. Accordingly, it is sufficient if only the upper portion of the enclosure is transparent, and the lower portion may be of other material capable of achieving the aforedescribed objectives.

Figure 6:
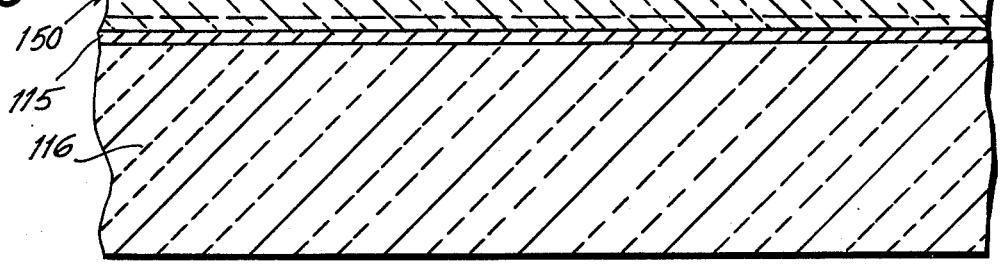
FIG. 6 is a sectional view of one embodiment of heat transfer apparatus which can be used with this invention.

An alternative embodiment of heat transfer apparatus is depicted in FIG. 6. Whereas the embodiments of FIGS. 1-5 provide discrete conduits 114 for carrying the heat transfer fluid, the alternative embodiment of FIG. 6 contemplates the use of a wicking material in place of the discrete conduit. In one embodiment wherein the wicking material is relatively thin in its cross-sectional dimensions, it should exhibit high heat insulating properties, but should permit a suitable heat transfer fluid to flow therethrough. With the use of such a wicking material 150, substantially the entire surface of the heat collecting plate 144 is utilized to transfer heat to the heat transfer fluid. One type of suitable wicking material is a hydrophilic material. Such hydrophilic material can be a cross-linked hydrophilic foam which may be prepared by capping polyoxyethylene polyol with a polyisocyanate. such hydrophilic materials, and their preparations, are disclosed in more detail in U.S. Pat. Nos. 3,812,618 and 3,812,619. Other hydrophilic polyurethane foams may be used as the wicking material 150. As a further alternative, the wicking material may comprise a porous layer made of polytetrafluoroethylene resins. This material is prepared in the manner described in U.S. Pat. No. 3,813,461. As a still further example of the wicking material 140, a polyester polyurethane sponge of the type disclosed in U.S. Pat. No. 3,806,474 can be used. As still further examples, the wicking material 150 may comprise an open-celled microporous material. Examples of such open-celled materials are disclosed in detail in U.S. Pat. No. 3,801,404. As still further examples of the wicking material 150, a ribbed PVC layer can be used. The ribbings serve as suitable guide channels for the fluid, whereas the PVC material exhibits satisfactory heat insulating properties. If desired, a hydrophilic foam may be injected between the ribbings. It is, of course, apparent that the particular wicking material 150 should be capable of sustaining high temperatures, on the order of up to about 600° F., and the heat transfer fluid used therewith likewise should be capable of sustaining such high temperatures without undergoing deleterious physical of chemical changes.

In an alternative embodiment wherein the wicking material is relatively thick, it may exhibit good heat conducting properties, such as the material described in U.S. Pat. No. 3,490,718.

Depending upon the type of wicking material 150 which is employed, the heat collecting plate 144 may comprise merely the upper surface of such material. Of course, the upper surface thereof preferably should be darkened to enhance the heat absorption properties which are necessary to effect a transfer of heat to the fluid which is permitted to flow through the wicking material.

It is appreciated that the wicking material 150 may perform a dual function: viz., to provide a conduit for the heat transfer fluid, and to absorb solar radiation.

The latter is readily achieved if the wicking material is suitably darkened. Accordingly, in one embodiment thereof, the wicking material may contain a dark pigment such as dark metal oxides or chromes, or may be provided with graphite, carbon black, lead powder, copper powder, aluminum powder, or the like. If the wicking material 150 is of the type described in any of the above-mentioned patents, and is prepared in the manner disclosed therein, a substantial portion (e.g. 50% or more) of the inorganic filler materials used therewith can be replaced by these dark pigments.

One advantage of using a wicking material 150 such as a hydrophilic material, a porous polytetrafluoroethylene resin or an open-celled microporous sheet, as some examples, is to avoid bursting of pipes, as was the case heretofore when temperatures fell below the freezing point of the heat transfer fluid. Another advantage derived from these materials is that the heat transfer apparatus can be flexible. This facilitates installation and handling of the heat transfer apparatus. A further advantage obtained from the use of such wicking materials relates to the intrinsic fluid filtering properties thereof. That is, if the heat transfer fluid is, for example, water, the wicking material 150 can be filled with activated carbon to deodorize and remove impurities from the water passing therethrough. Also, if the wickin material is furnished with, for example, a germicidal quaternary salt, an iodoform, or the like, the fluid flowing therethrough will be disinfected.

Although the heat transfer apparatus has been described above in combination with the solar radiation concentrating troughs, such heat transfer apparatus can, itself, be used as a solar heat collector. Thus, solar radiation can impinge directly onto the surface 144 of the wicking material 150 to be absorbed thereat and, in addition, to be absorbed by the pigmented material. A contemplated application of such a solar heat collector is as a simple, inexpensive water heater for a swimming pool or the like. The solar heat collector can be mounted on a suitable support base and inclined with respect to the swimming pool. Water from the pool is pumped to the uppermost portion of the heat collector and, from there, the wicking material serves as a conduit to guide the water, under the influence of gravity, through the collector to emerge at the bottommost portion and return to the swimming pool. Water flows relatively slowly through the wicking material 150 while heat, converted from the received solar radiation, is transferred thereto.

It may be recognized that if the wicking material 150 is formed by hydrophilic material, a substantially uniform fluid flow is obtained, and thus uniform heat transfer is realized. Accordingly, if the heat transfer apparatus is somewhat tilted, fluid does not necessarily aggregate to one side or the other as a consequence thereof.

The wicking material 150 has been described above as a hydrophilic or other material having an affinity for water. Of course, the heat transfer fluid need not be limited to water or be water soluble. For example, the fluid may be a lipide, whereby the wicking material 150 preferably is a lipophilic material. As another example, the fluid may be an oil, whereby the wicking material preferably is an oleophilic material.

Yet another embodiment of the heat transfer apparatus which can be used with the present invention is illustrated in FIG. 7. As shown therein, an additional insulating layer 152 is provided beneath the insulating base 116. The layer 152 may be formed as an integral part of the housing and thus may comprise a rigid heat insulating material such as "Xentex", or may be of a material of the type disclosed in U.S. Pat. No. 3,481,887. It is appreciated that the layer 152 serves to provide both thermal insulation and structural support for the solar energy converting apparatus 100.

While the present invention has been particularly described in detail with respect to preferred embodiments thereof, it is evident that various changes and modifications in form and details may be made without departing from the spirit and scope of the invention. For example, various other types of insulating and structural supporting materials can be used. Similarly, various alternatives are envisaged to the drive apparatus which can be used to rotate the pivot axis shafts 118 and thus pivotally drive the respective collecting troughs. Also, various types of fluid conduits can be used, such as the discrete channels 114 or the wicking material 150. Depending upon the particular application of the solar energy converting apparatus 100, the wicking material 150 may be provided with suitable filtering materials, or may be formed of materials which intrinsically perform a filtering operation, so as to filter the fluid which is used as a heat transfer medium. As a consequence thereof, such heat transfer fluid can be deodorized, impurities can be removed therefrom and the fluid can be purified.

As a further modification, the present invention is adapted to convert received solar radiation directly into electrical energy. Hence, the conduits 114 of FIGS. 1A, 1B, 3, 4 and 5 can be replaced with strips of, for example, photovoltaic cells capable of generating a voltage potential in response to the received solar radiation.

Therefore, it is intended that the appended claims be interpreted as including the foregoing as well as other such obvious modifications and changes.

What is claimed is:

1. Solar energy converting apparatus comprising a plurality of parallel, substantially parabolic-shaped troughs having receiving portions for receiving solar radiation and for directing same to exit portions thereof, adjacent troughs being formed with side walls in back-to-back relation, with at least one end wall provided between a pair of back-to-back side walls; pivot means comprising shafts extending from said end walls and being substantially parallel to the longitudinal axes of said troughs, said troughs being pivotable about said axes; support means for supporting said troughs; and heat transfer means disposed adjacent said exit portions of said troughs and defining a conduit for heat transfer fluid to transfer heat to said heat transfer fluid.

2. Solar energy converting apparatus in accordance with claim 1 wherein said heat transfer means comprises a heat collecting plate disposed opposite said exit portions of said troughs and having a darkened surface to absorb heat, a layer of hydrophilic polymeric material through which flows said heat transfer fluid, said heat collecting plate being mounted on an upper surface of said hydrophilic polymeric material and the lower surface of said hydrophilic polymeric material being provided with a reflective layer.

3. Solar energy converting apparatus in accordance with claim 2 wherein said hydrophilic polymeric material is mounted on a further layer of thermal insulating material.

4. The apparatus of claim 2 wherein said hydrophilic material is comprised of a foam containing dark pigmented material.

5. The apparatus of claim 2 wherein said hyrophilic material comprises a cross-linked hydrophilic foam formed by capping polyoxyethylene polyol with a polyisocyanate.

6. The apparatus of claim 2 wherein said hydrophilic material contains filter materials for removing impurities from said heat transfer fluid flowing therethrough.

7. The apparatus of claim 2 wherein said hydrophilic material comprises a layer of open-celled microporous material having a darkened surface to receive said solar radiation and defining a fluid conduit.

8. The apparatus of claim 2 wherein said hydrophilic material comprises a porous layer of polytetrafluoroethylene resin having a darkened surface to receive said solar radiation and defining a fluid conduit.

* * * * *